(12) United States Patent
Kamijo (10) Patent No.: US 8,781,666 B2
(45) Date of Patent: Jul. 15, 2014

(54) VEHICLE AND METHOD OF CONTROLLING THE SAME

(71) Applicant: Yusuke Kamijo, Toyota (JP)

(72) Inventor: Yusuke Kamijo, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/658,408

(22) Filed: Oct. 23, 2012

(65) Prior Publication Data

US 2013/0103239 A1 Apr. 25, 2013

(30) Foreign Application Priority Data

Oct. 24, 2011 (JP) ................................. 2011-233001

(51) Int. Cl.
| | | |
|---|---|---|
| *B60L 9/00* | (2006.01) | |
| *B60L 11/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |

(52) U.S. Cl.
USPC ................ 701/22; 180/65.21; 180/65.245; 180/65.265; 477/5; 477/175; 477/181

(58) Field of Classification Search
USPC .......... 701/22; 180/65.2, 65.265, 65.4; 477/5, 477/175, 181
See application file for complete search history.

(56) References Cited

U.S. PATENT DOCUMENTS

| 7,909,123 | B2 * | 3/2011 | Ebuchi et al. ............ 180/65.235 |
| 7,983,833 | B2 * | 7/2011 | Sugai ............................ 701/112 |
| 2002/0019687 | A1 * | 2/2002 | Suzuki et al. .................... 701/22 |
| 2007/0151536 | A1 * | 7/2007 | Yamauchi et al. ......... 123/179.4 |
| 2007/0210641 | A1 * | 9/2007 | Itoh et al. ........................ 303/11 |
| 2007/0298928 | A1 * | 12/2007 | Yamanaka et al. .............. 477/15 |
| 2009/0062063 | A1 * | 3/2009 | Yamanaka et al. ................ 477/5 |
| 2010/0268434 | A1 * | 10/2010 | Hugenroth et al. ........... 701/102 |
| 2011/0017165 | A1 * | 1/2011 | Osawa et al. .............. 123/179.4 |
| 2011/0028260 | A1 * | 2/2011 | Kawasaki et al. ............. 475/220 |
| 2011/0118077 | A1 * | 5/2011 | Kawasaki et al. ............... 477/3 |
| 2012/0277059 | A1 * | 11/2012 | Akutsu et al. .................... 477/5 |

FOREIGN PATENT DOCUMENTS

JP 2009-173125 A 8/2009

* cited by examiner

*Primary Examiner* — Muhammad Shafi
*Assistant Examiner* — Majdi Alsomiri
(74) *Attorney, Agent, or Firm* — Gifford, Krass, Sprinkle, Anderson & Citkowski, P.C.

(57) ABSTRACT

A vehicle includes: an engine; an electric motor connected to the engine via a gear; and a controller configured to perform control that includes at least one of increasing a rotational speed of the engine to a value that is equal to or higher than a given value and changing an output torque of the electric motor to a value that is out of a given range including zero, provided that a target output torque of the electric motor is within the given range including zero and a target rotational speed of the engine is lower than the given value, during deceleration accompanied by motoring of the engine.

9 Claims, 12 Drawing Sheets

VEHICLE AND METHOD OF CONTROLLING THE SAME

INCORPORATION BY REFERENCE

The disclosure of Japanese Patent Application No. 2011-233001 filed on Oct. 24, 2011 including the specification, drawings and abstract is incorporated herein by reference in its entirety.

BACKGROUND OF THE INVENTION

1. Field of the Invention

The invention relates to a vehicle and a method of controlling the vehicle, and particularly relates to a vehicle on which an engine and an electric motor connected to the engine via a gear are installed, and a method of controlling the vehicle.

2. Description of Related Art

Hybrid vehicles on each of which an electric motor serving as a driving power source is installed in addition to an engine have been marketed. Part of the hybrid vehicles may be classified as one type of electric vehicles. In the hybrid vehicle, the engine and the electric motor are connected to each other via a planetary gear, for example.

When the output torque of the electric motor is in the vicinity of zero in the hybrid vehicle in which the engine and the electric motor are connected via a gear, the gear may vibrate because of the output torque of the engine, and tooth surfaces of the gear may repeatedly collide with each other. In this case, sound may be generated from the gear, and the sound may cause a passenger of the vehicle to feel uncomfortable.

In paragraph [0041] of Japanese Patent Application Publication No. 2009-173125 (JP 2009-173125 A), it is described that, in, order to solve the above-described problem, an operating point of the engine is set during load operation of the engine, based on an operating line that makes it possible to suppress occurrence of abnormal sound in the gear. It is also described in paragraph [0043] of JP 2009-173125 A that, in order to reduce the amount of change of the engine speed when the engine shifts from independent (no-load or idle) operation to load operation, the engine is operated under no load, or independently, at the lowest rotational speed of the operating line, on which it is possible to suppress occurrence of abnormal sound in the gear.

When the engine is in a motored state (in which the output shaft of the engine is rotated while ignition is stopped), no torque is transmitted from the engine to the gear; therefore, sound generated from the gear between the engine and the electric motor is small. However, when the engine shifts from the motored state to a state in which the engine operates under a load, the output torque of the engine becomes excessively large for a moment, and sound may be generated from the gear, via which the engine and the electric motor are connected to each other. This situation is not considered nor addressed at all in JP 2009-173125 A.

SUMMARY OF THE INVENTION

The invention provides a vehicle and a method of controlling the vehicle, with which it is made possible to reduce sound generated from a gear, via which an engine and an electric motor are connected to each other.

A vehicle according to a first aspect of the invention includes an engine, an electric motor connected to the engine via a gear, and a controller configured to perform control that includes at least one of increasing a rotational speed of the engine to a value that is equal to or higher than a given value and changing an output torque of the electric, motor to a value that is out of a given range including zero, provided that a target output torque of the electric motor is within the given range including zero and a target rotational speed of the engine is lower than the given value, during deceleration accompanied by motoring of the engine.

Since the amount of variations in torque of the engine is reduced as the engine speed increases, if the rotational speed of the engine is increased in advance before the engine is operated under a load, sound is less likely to be generated from the gear, via which the engine and the electric motor are connected to each other. Therefore, when the engine shifts from a motored state to a state in which the engine operates under a load, sound generated from the gear, via which the engine and the electric motor are connected to each other can be reduced by increasing the engine speed in advance.

Since tooth surfaces of the gear, via which the engine and the electric motor are connected to each other, become less likely to be spaced apart from each other as the absolute value of the output torque of the electric motor increases, if the absolute value of the output torque of the electric motor is increased in advance before the engine is operated under a load, sound generated because of collision of the tooth surfaces of the gear is less likely to be generated. Therefore, when the engine shifts from a motored state to a state in which the engine operates under a load, sound generated from the gear, via which the engine and the electric motor are connected to each other, can be reduced by increasing the absolute value of the output torque of the electric motor in advance.

A method of controlling a vehicle according to a second aspect of the invention is a method of controlling a vehicle including an engine and an electric motor connected to the engine via a gear, the method including performing control that includes at least one of increasing a rotational speed of the engine to a value that is equal to or higher than a given value and changing an output torque of the electric motor to a value that is out of a given range including zero, provided that a target output torque of the electric motor is within the given range including, zero and a target rotational speed of the engine is lower than the given value, during deceleration accompanied by motoring of the engine.

Also with the control method according to the second aspect, effects similar to those obtained by the vehicle according to the above first aspect are obtained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention will be described below with reference to the drawings. In the following description, the same reference numerals are assigned to the same components having the same names and functions. Accordingly, these components will not be repeatedly described in detail.
(First Embodiment)

Figure 1:
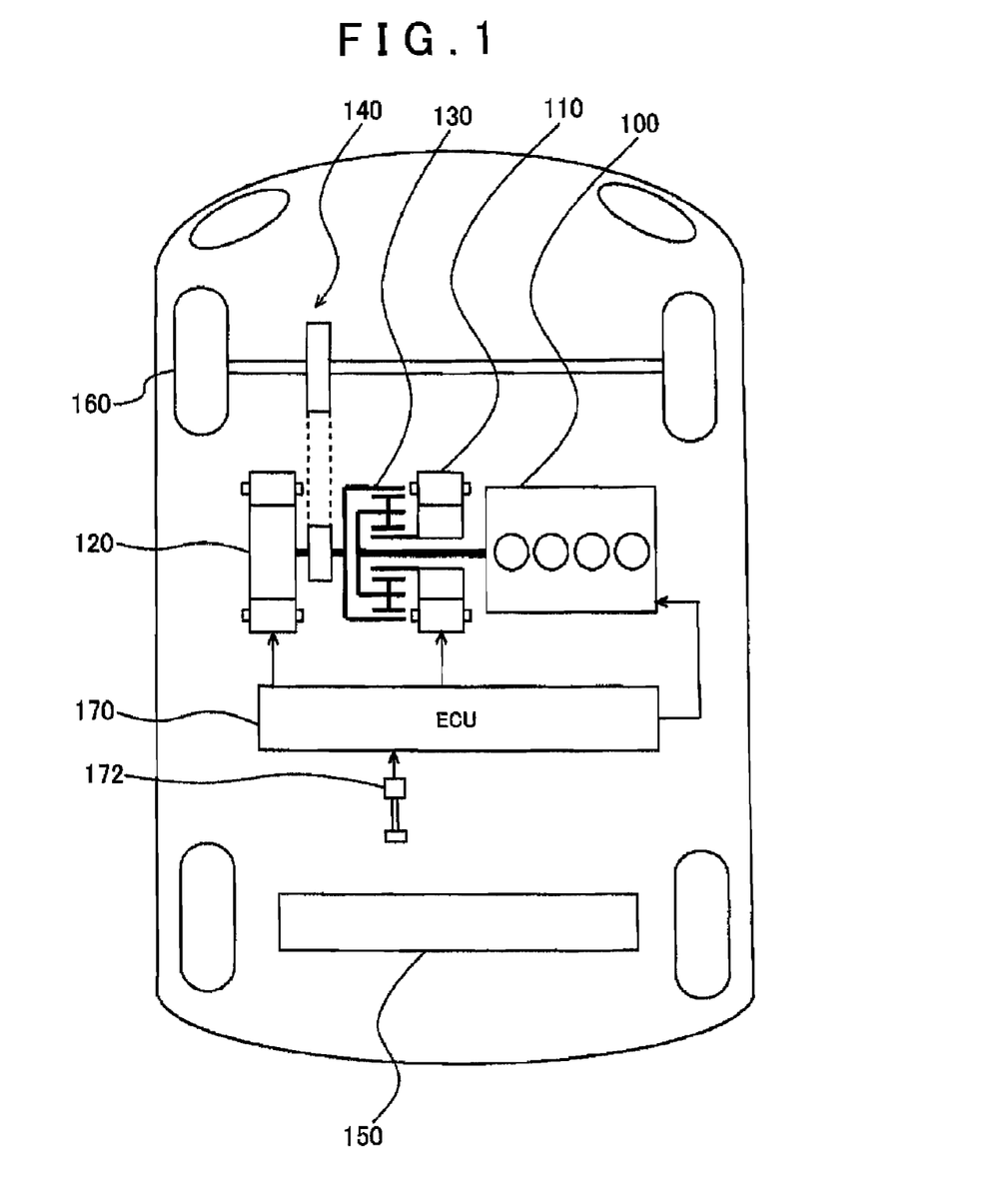
FIG. 1 is a schematic configuration diagram showing a hybrid vehicle.

Referring to FIG. 1, an engine 100, a first motor-generator 110, a second motor-generator 120, a power distribution mechanism 130, a reduction gear 140, and a battery 150 are installed on a hybrid vehicle. While in the following description, a hybrid vehicle having no function of being charged from an external power supply is described as an example, a plug-in hybrid vehicle having a function of being charged from, an external power supply may be used as the hybrid vehicle of the invention.

The engine 100, the first motor-generator 110, the second motor-generator 120, and the battery 150 are controlled by an electronic control unit (ECU) 170. The ECU 170 may be divided into two or more ECUs.

A power train of the hybrid vehicle includes the engine 100, the first motor-generator 110, the second motor-generator 120, and the ECU 170 that controls these components. The hybrid vehicle is driven by the driving force transmitted from at least one of the engine 100 and the second motor-generator 120. Specifically, one or both of the engine 100 and the second motor-generator 120 is/are automatically selected as a driving power source(s) according to operating conditions.

For example, the engine 100 and the second motor-generator 120 are controlled in accordance with the result of operation of an accelerator pedal by the driver. The amount of operation of the accelerator pedal (accelerator depression amount) is detected by an accelerator depression amount sensor 172.

In the case where the accelerator depression amount is small (i.e., the accelerator pedal is operated by a small degree), and the case where the vehicle speed is low, for example, the hybrid vehicle is driven using only the second motor-generator 120 as a driving power source. In this case, the engine 100 is stopped, except for the case where the engine 100 is driven so as to generate electric power.

In the case where the accelerator depression amount is large (i.e., the accelerator pedal is operated by a large degree), the case where the vehicle speed is high, and the case where the remaining charge (SOC: State Of Charge) of the battery 150 is small, for example, the engine 100 is driven. In this case, the hybrid vehicle is driven using only the engine 100, or both of the engine 100 and the second motor-generator 120, as a driving power source(s).

Figure 2:
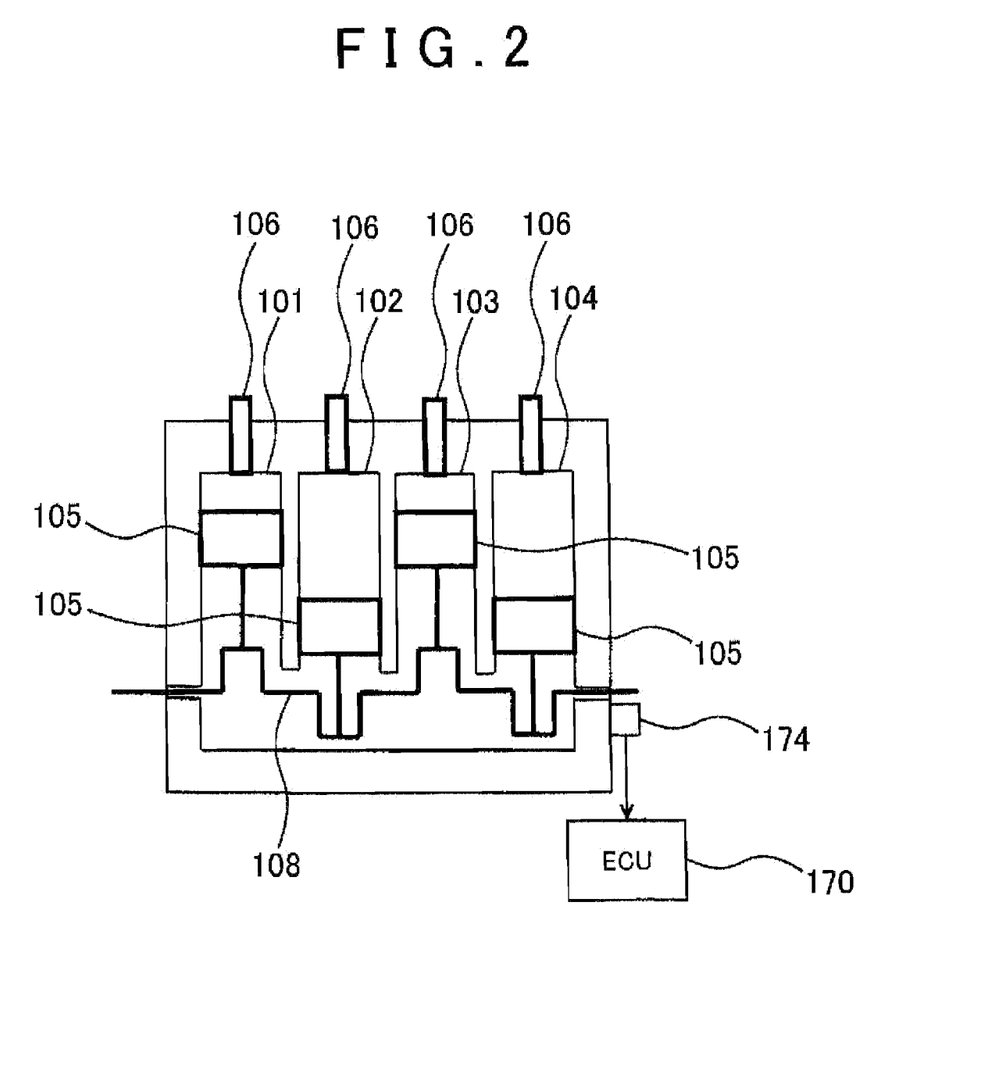
FIG. 2 is a schematic configuration diagram showing an engine.

The engine 100 is an internal combustion engine. As shown in FIG. 2, in this embodiment, the engine 100 is a four-stroke engine having a first cylinder 101, a second cylinder 102, a third cylinder 103, and a fourth cylinder 104. The number of cylinders provided in the engine is not limited to four, but may be any number, such as five, six, eight, or twelve.

As well known in the art, each cylinder in the engine 100 is provided with an intake valve(s) (not shown), an exhaust valve(s) (not shown), a piston 105, a spark plug 106, and an injector (not shown). Each piston 105 is connected to a crankshaft as an output shaft 108 via a connecting rod. Accordingly, each piston 105 moves up and down as the crankshaft rotates. Fuel is injected from each injector into the corresponding cylinder.

When the intake valve is opened, and the piston 105 moves down while the exhaust valve is closed, air is drawn by suction into the cylinder via the intake valve (intake stroke). The air is compressed when the piston 105 moves up while the intake valve and exhaust valve are closed (compression stroke). If a mixture of air and fuel is ignited, using the spark plug 106, for example, the air-fuel mixture is burned, and expands. As a result, the piston 105 moves down (combustion stroke or expansion stroke). As a result, the crankshaft is rotated. Then, the exhaust valve is opened, and the piston 105 moves up, so that exhaust gas is discharged (exhaust stroke). The air-fuel mixtures in the respective cylinders are ignited in a predetermined order. For example, the ignition takes place in the order of the first cylinder 101, the third cylinder 103, the fourth cylinder 104, and the second cylinder 102, for example. It is, however, to be noted that the order of ignition is not limited to this order.

The rotational speed (angular speed) of the engine 100 is detected by a rotational speed sensor (crank position sensor) 174, and a signal indicative of the result of detection is transmitted to the ECU 170. As well known in the art, the engine speed NE, i.e., the number of revolutions of the output shaft 108 per minute, is calculated from the rotational speed of the engine 100.

Referring back to FIG. 1, the engine 100, the first motor-generator 110 and the second motor-generator 120 are connected to the output shaft (crankshaft) 108 of the engine 100 via the power distribution mechanism 130. The power distribution mechanism 130 divides power generated by the engine 100 into two channels. Power transmitted through one of the two channels is used for driving the front wheels 160 via the reduction gear 140. Power transmitted through the other channel is used for driving the first motor-generator 110 so as to generate electric power.

The first motor-generator 110 is a three-phase alternating-current (AC) rotary electric machine having a U-phase coil, a V-phase coil, and a W-phase coil. The first motor-generator 110 generates electric power, using power of the engine 100 divided by the power distribution mechanism 130. The electric power generated by the first motor-generator 110 is used for different purposes, depending on the running conditions of the vehicle, and the state of charge (or remaining charge) of the battery 150. For example, during normal running of the vehicle, electric power generated by the first motor-generator 110 is directly used to drive the second motor-generator 120. If the SOC of the battery 150 is lower than a predetermined value, electric power generated by the first motor-generator 110 is converted from AC power into direct-current (DC) power, by means of an inverter, which will be described later.

Then, the voltage is controlled by a converter, which will be described later, and the power is stored in the battery 150.

When the first motor-generator 110 operates as a generator, the first motor-generator 110 produces negative torque. Here, the negative torque means torque that becomes a load of the engine 100. When the first motor-generator 110 is supplied with electric power and operates as a motor, the first motor-generator 110 produces positive torque. Here, the positive torque means torque that does not become a load of the engine 100, namely, torque that assists rotation of the engine 100. Similarly, the second motor-generator 120 operates as a generator or a motor in the same manner.

The second motor-generator 120 is a three-phase AC rotary electric machine having a U-phase coil, a V-phase coil, and a W-phase coil. The second motor-generator 120 is driven by at least one of electric power stored in the battery 150 and electric power generated by the first motor-generator 110.

The driving force of the second motor-generator 120 is transmitted to the front wheels 160 via the reduction gear 140. In this manner, the second motor-generator 120 assists the engine 100 in driving the vehicle, or the vehicle is driven using driving force from the second motor-generator 120. The second motor-generator 120 may be arranged to drive the rear wheels instead of or in addition to the front wheels 160.

During regenerative braking of the hybrid vehicle, the second motor-generator 120 is driven by the front wheels 160 via the reduction gear 140, so that the second motor-generator 120 operates as a generator. Thus, the second motor-generator 120 operates as a regenerative brake that converts braking energy into electric power. The electric power generated by the second motor-generator 120 is stored in the battery 150.

The power distribution mechanism 130 includes a planetary gear having a sun gear, pinions, a carrier, and a ring gear. The pinions engage with the sun gear and the ring gear. The carrier supports the pinions so that the pinions are rotatable about their own axes. The sun gear is coupled to a rotary shaft of the first motor-generator 110. The carrier is coupled to the crankshaft of the engine 100. The ring gear is coupled to a rotary shaft of the second motor-generator 120 and the reduction gear 140.

Figure 3:
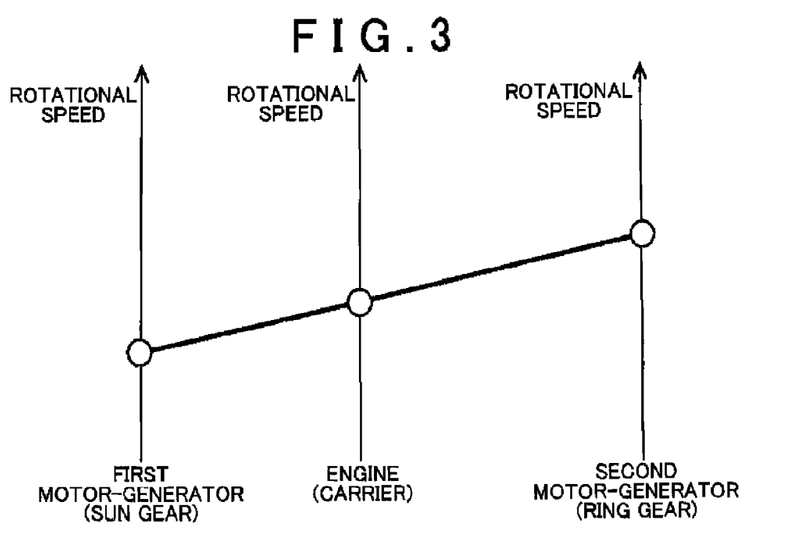
FIG. 3 is a diagram showing an alignment chart of a power distribution mechanism.

With the engine 100, the first motor-generator 110 and the second motor-generator 120 connected via the power distribution mechanism 130 in the form of the planetary gear, the rotational speeds of the engine 100, the first motor-generator 110 and the second motor-generator 120 have a relationship as shown in the alignment chart of FIG. 3, in which these rotational speeds are connected by a straight line.

Figure 4:
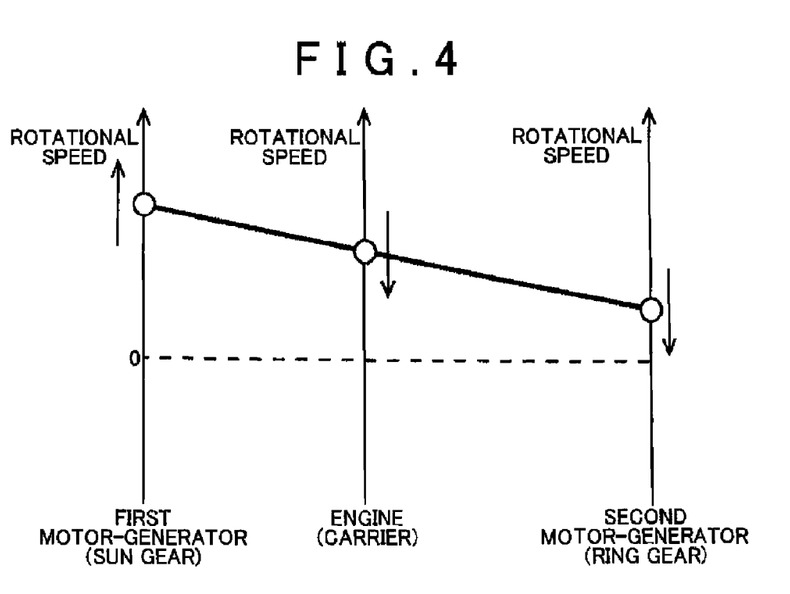
FIG. 4 is a diagram showing an alignment chart of the power distribution mechanism.

As one example, when the accelerator depression amount is zero (i.e., the accelerator pedal is not operated), fuel cut control is performed in the engine 100 during deceleration of the vehicle, and the first motor-generator 110 is driven so as to motor the engine 100, as shown in FIG. 4, whereby it is possible to provide desired braking force. The output torque of the second motor-generator 120 is controlled as needed, according to a difference between the target braking force and the braking force obtained through motoring of the engine 100. Arrows in FIG. 4 indicate directions of torque applied to the sun gear, carrier and ring gear, respectively, of the power distribution mechanism.

Figure 5:
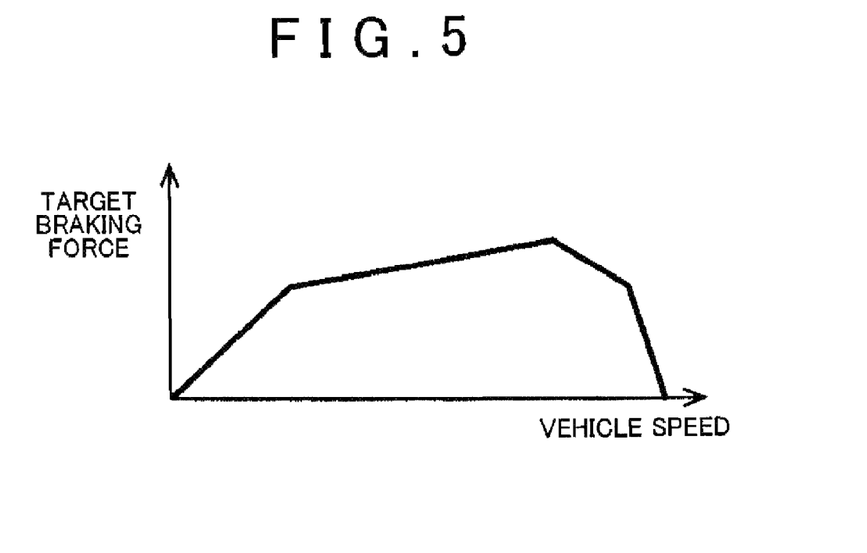
FIG. 5 is a diagram showing an example of a map used for setting braking force.

As shown in FIG. 5, the target braking force is calculated from a map having at least the vehicle speed as a parameter, for example. The map used for calculating the target braking force is prepared in advance by a developer, based on the results of experiments and simulations. The method of calculating the target braking force is not limited to this method. The braking force may be represented by negative driving force.

In this embodiment, "motoring" means rotating the output shaft 108 of the engine 100 using torque from the first motor-generator 110 or torque from the drive wheels, in a state where ignition is stopped in the engine 100.

Referring back to FIG. 1, the battery 150 is a battery pack constructed by connecting a plurality of battery modules in series, each of the battery modules being formed by integrating a plurality of battery cells. The voltage of the battery 150 is, for example, about 200V. The battery 150 is charged with electric power supplied from an external power supply outside the vehicle, as well as the first motor-generator 110 and the second motor-generator 120. A capacitor may also be used in place of or in addition to the battery 150.

Figure 6:
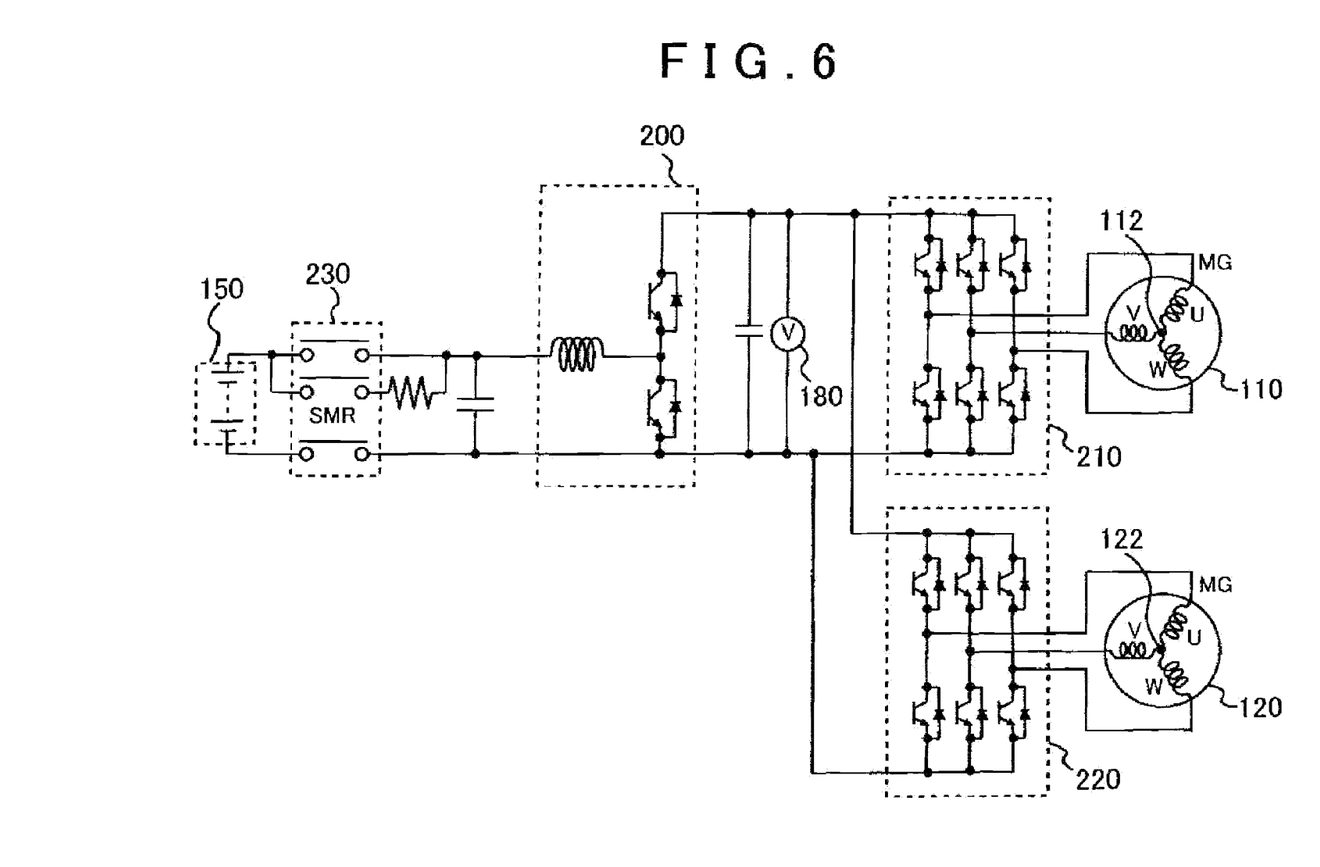
FIG. 6 is a diagram showing an electric system of the hybrid vehicle.

Referring to FIG. 6, an electric system of the hybrid vehicle will be further described. The hybrid vehicle includes a converter 200, a first inverter 210, a second inverter 220, and a system main relay 230.

The converter 200 includes a reactor, two npn-type transistors, and two diodes. The reactor is connected at one end to the positive electrode side of each battery, and connected at the other end to a connecting point of the two npn-type transistors.

The two npn-type transistors are connected in series. The npn-type transistors are controlled by the ECU 170. A diode is connected between the collector and emitter of each npn-type transistor, so as to allow electric current to flow from the emitter side to the collector side.

For example, an IGBT (Insulated Gate Bipolar Transistor) may be used as the npn type transistor. A power switching device, such as a power metal oxide semiconductor field-effect transistor (MOSFET), may be used in place of the npn-type transistor.

When electric power discharged from the battery 150 is supplied to the first motor-generator 110 or the second motor-generator 120, the voltage is boosted by the converter 200. Conversely, when the battery 150 is charged with electric power generated by the first motor-generator 110 or the second motor-generator 120, the voltage is stepped down by the converter 200.

The system voltage VH between the converter 200 and each inverter is detected by a voltage sensor 180. The result of detection of the voltage sensor 180 is transmitted to the ECU 170.

The first inverter 210 includes a U-phase arm, a V-phase arm, and a W-phase arm. The U-phase arm, the V-phase arm and the W-phase arm are connected in parallel. Each of the U-phase arm, V-phase arm and W-phase arm has two npn-type transistors connected in series. A diode is connected between the collector and emitter of each npn-type transistor, so as to allow electric current to flow from the emitter side to the collector side. A connecting point of the npn-type transistors in each arm is connected to an end of each coil of the first motor-generator 110, the end being different from or opposite to a neutral point 112.

The first inverter 210 converts DC current supplied from the battery 150 into AC current, and supplies the AC current to the first motor-generator 110. The first inverter 210 also converts AC current generated by the first motor-generator 110 into DC current.

The second inverter 220 includes a U-phase arm, a V-phase arm, and a W-phase arm. The U-phase arm, V-phase arm and W-phase arm are connected in parallel. Each of the U-phase arm, V-phase arm and W-phase arm has two npn-type transistors connected in series. A diode is connected between the collector and emitter of each npn-type transistor, so as to allow electric current to flow from the emitter side to the collector side. A connecting point of the npn-type transistors in each arm is connected to an end of each coil of the second motor-generator 120, the end being different from or opposite to a neutral point 122.

The second inverter 220 converts DC current supplied from the battery 150 into AC current, and supplies the AC current to the second motor-generator 120. The second inverter 220 also converts AC current generated by the second motor-generator 120 into DC current.

The converter 200, the first inverter 210, and the second inverter 220 are controlled by the ECU 170.

The system main relay 230 is provided between the battery 150 and the converter 200. The system main relay 230 is a relay that switches between a state in which the battery 150 is connected to the electric system and a state in which the battery 150 is disconnected from the electric system. When the system main relay 230 is in an open state, the battery 150 is disconnected from the electric system. When the system main relay 230 is in a closed state, the battery 150 is connected to the electric system.

The state of the system main relay 230 is controlled by the ECU 170. For example, when the ECU 170 is started, the system main relay 230 is closed. When the ECU 170 is stopped, the system main relay 230 is opened.

Figure 7:
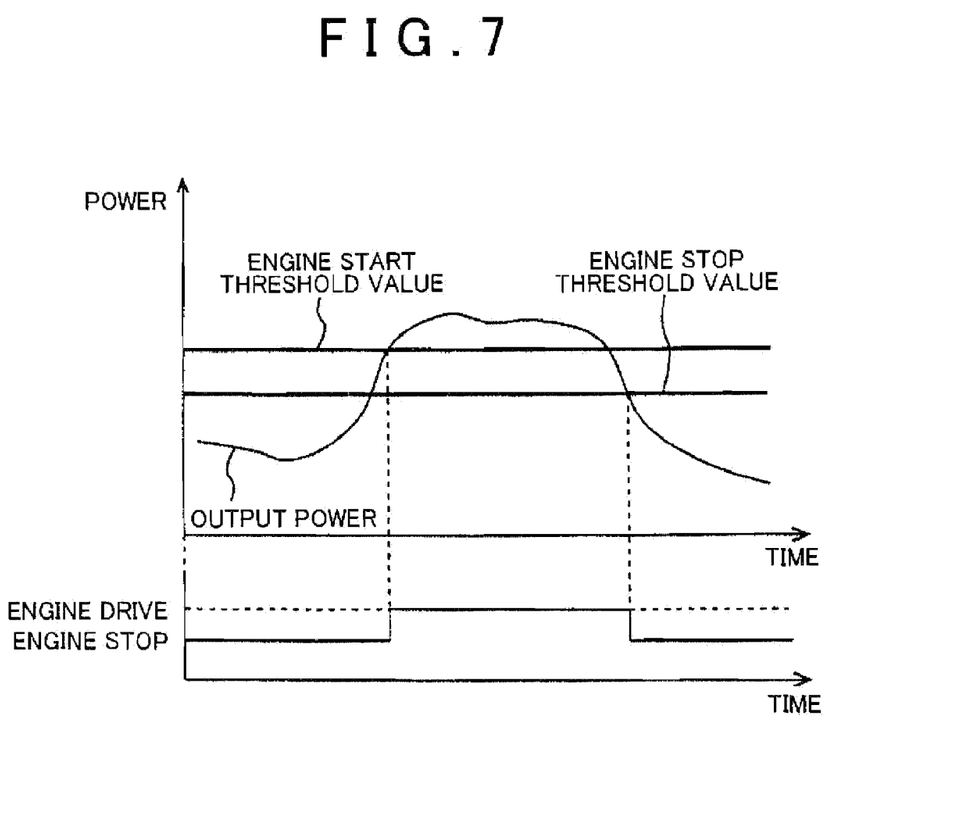
FIG. 7 is a diagram showing a specific example of a period in which the engine is driven and a period(s) in which the engine is stopped.

Referring to FIG. 7, the manner of controlling the engine 100 will be further described. As shown in FIG. 7, when the output power of the hybrid vehicle is smaller than an engine start threshold value, the hybrid vehicle is driven using only the driving force of the second motor-generator 120.

The output power is set as power used for driving the hybrid vehicle. The ECU 170 calculates the output power according to a map having the accelerator depression amount, the vehicle speed, etc. as parameters, for example. The method of calculating the output power is not limited to this method. As an alternative to the output power, torque, acceleration, driving force, accelerator depression amount or pedal position, or the like, may be used.

When the output power of the hybrid vehicle becomes equal to or larger than the engine start threshold value, the engine 100 is started. As a result, the hybrid vehicle is driven, using the driving force of the engine 100 in addition to or in place of the driving force of the second motor-generator 120. Also, electric power generated by the first motor-generator 110 using the driving force of the engine 100 is directly supplied to the second motor-generator 120.

Figure 8:
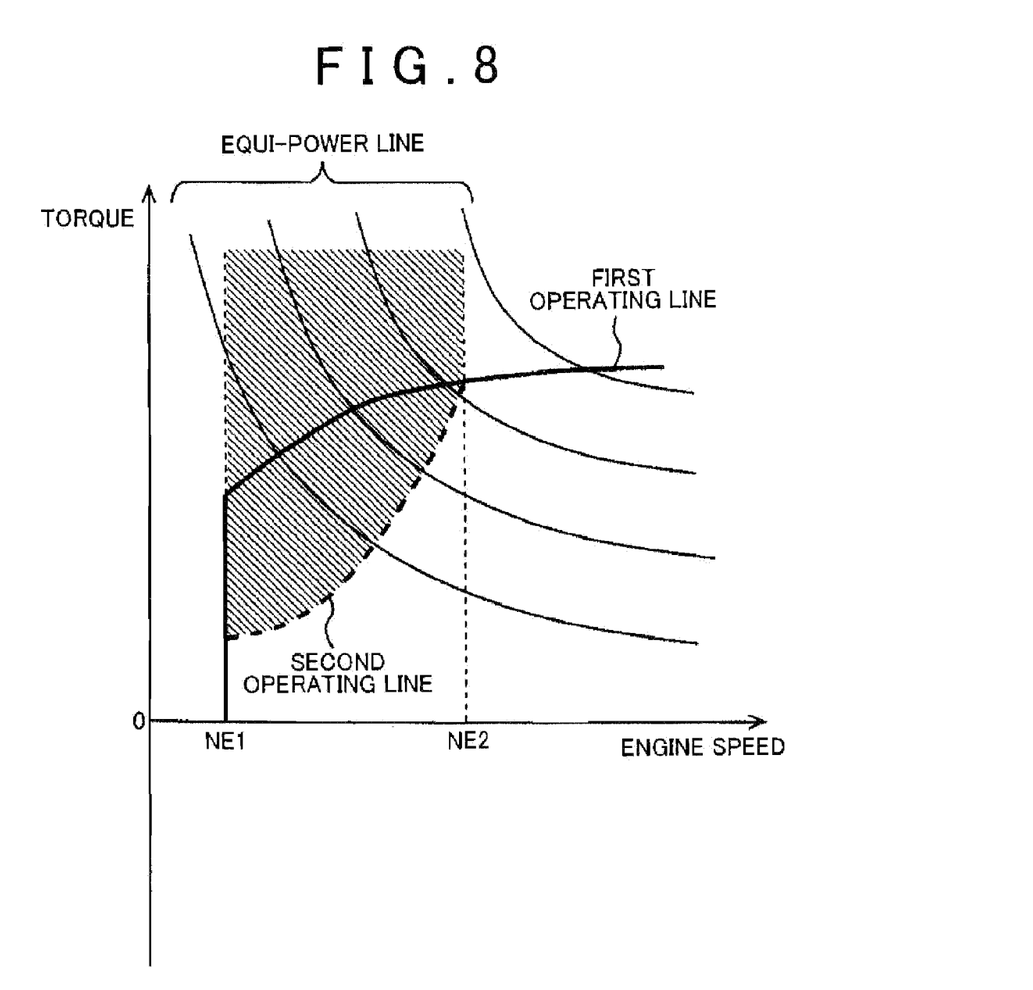
FIG. 8 is a diagram showing operating lines and equi-power lines of the engine.

As shown in FIG. 8, the operating point of the engine 100, namely, the engine speed NE and the output torque TE, during load operation of the engine 100 is determined by an intersection of the output power and an operating line.

The output power is represented by an equi-power line. The operating line is determined in advance by the developer, based on the results of experiments and simulations. The operating line is set so that the engine 100 can operate with the fuel consumption optimized (or minimized). Specifically, the optimum fuel consumption is achieved when the engine 100 operates along the operating line.

When the output torque of the second motor-generator 120 is out of a given range including zero (i.e., when the absolute value of the output torque is larger than a given torque), a first operating line indicated by the solid line in FIG. 8 is used as the above-mentioned operating line.

Figure 9:
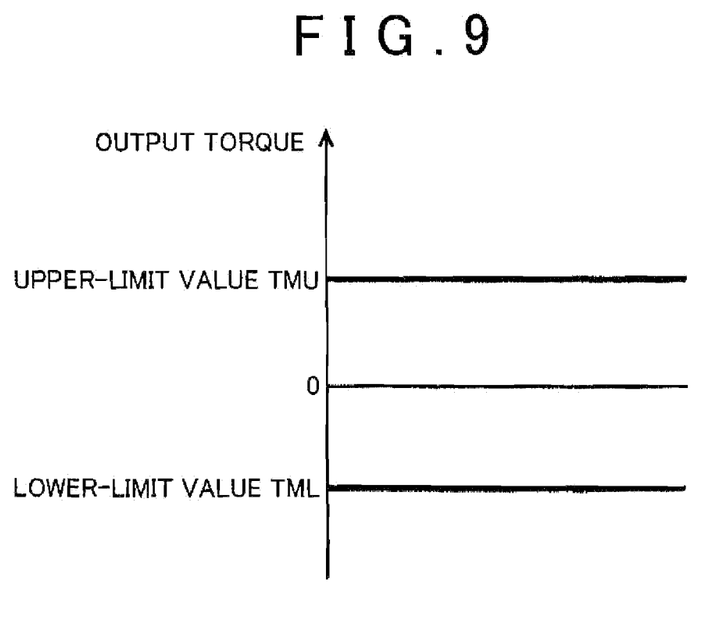
FIG. 9 is a diagram showing a range of output torque of a second motor-generator when a second operating line is used.

On the other hand, when the output torque of the second motor-generator 120 is within the given range including zero, between an upper-limit value TMU (TMU>0) and a lower-limit value TML (TML<0) as shown in FIG. 9 (i.e., when the absolute value of the output torque is equal to or smaller than the given torque), a second operating line as indicated by the broken line in FIG. 8 is used as the operating line, within a range in which the engine speed NE is between a given first speed NE1 and a given second speed NE2 as shown in FIG. 8. The second operating line is set so as to reduce sound generated from the power distribution mechanism 130 when the output torque of the second motor-generator 120 is within the given range including zero.

Specifically, when the output torque of the second motor-generator 120 is within the given range including zero, tooth surfaces of the gears in the power distribution mechanism 130 may be spaced apart from each other. Accordingly, the tooth surfaces of the gears in the power distribution mechanism 130 may repeatedly collide with each other, and sound may be generated, because of variations in the output torque of the engine 100. In particular, when the operating point of the engine 100 is within a region indicated by hatched lines in FIG. 8, the amount of variations in the output torque of the engine 100 is large, and sound is noticeably generated. When the second operating line is used instead of the first operating line in view of this situation, the engine speed NE is increased. Since the amount of variations in the output torque of the engine 100 tends to be reduced as the engine speed NE increases, the frequency of collisions between the tooth surfaces of the gears in the power distribution mechanism 130 can be reduced by increasing the engine speed NE. As a result, sound generated from the power distribution mechanism 130 is reduced.

On the other hand, the output torque of the engine 100 is equal to or smaller than zero during deceleration of the vehicle accompanied by motoring of the engine 100. Specifically, the output torque of the engine 100 is lower than the torque determined by the second operating line. Accordingly, no sound is supposed to be generated from the power distribution mechanism 130, during deceleration accompanied by motoring of the engine 100.

Figure 10:
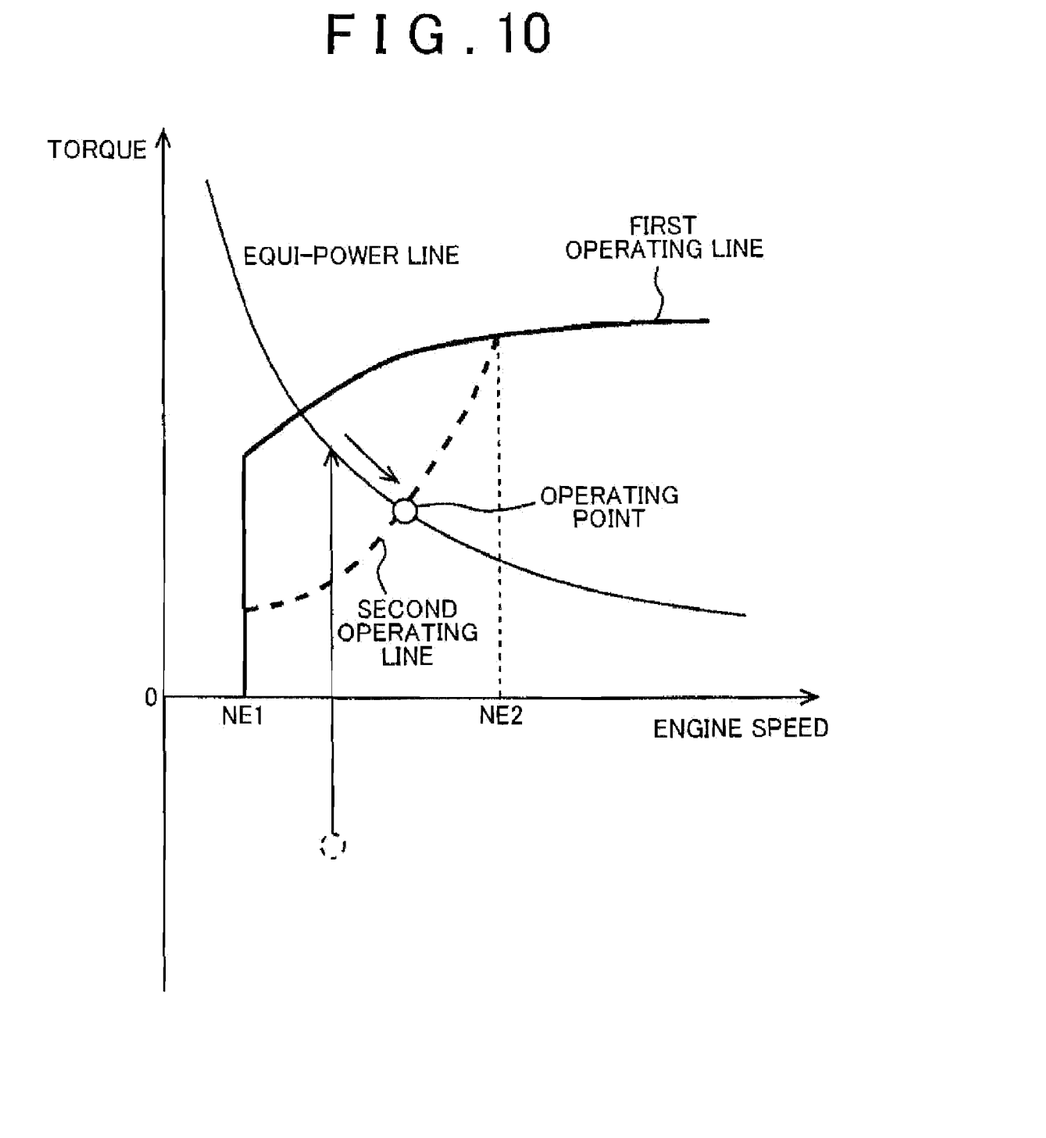
FIG. 10 is a diagram showing a trace of the operating point of the engine.

However, if the engine speed NE is lower than the second speed NE2, the output torque of the engine 100 may transiently pass the second operating line before moving onto the second operating line, as indicated by arrows in FIG. 10, when the engine 100 shifts from a state in which the engine 100 is motored, to a state in which the engine 100 operates under a load. At this time, sound may be generated from the power distribution mechanism 130.

In this embodiment, in order to reduce the sound generated from the power distribution mechanism 130, at least one of the output torque of the second motor-generator 120 and the engine speed NE is controlled during deceleration of the vehicle accompanied by motoring of the engine 100.

As one example, the engine speed NE is increased to be equal to or higher than the second speed NE2. As the engine speed NE increases, braking force generated by the second motor-generator 120 is reduced. Specifically, the output torque of the second motor-generator 120 is increased in the positive rotational direction (i.e., in such a direction as to accelerate the vehicle).

Figure 11:
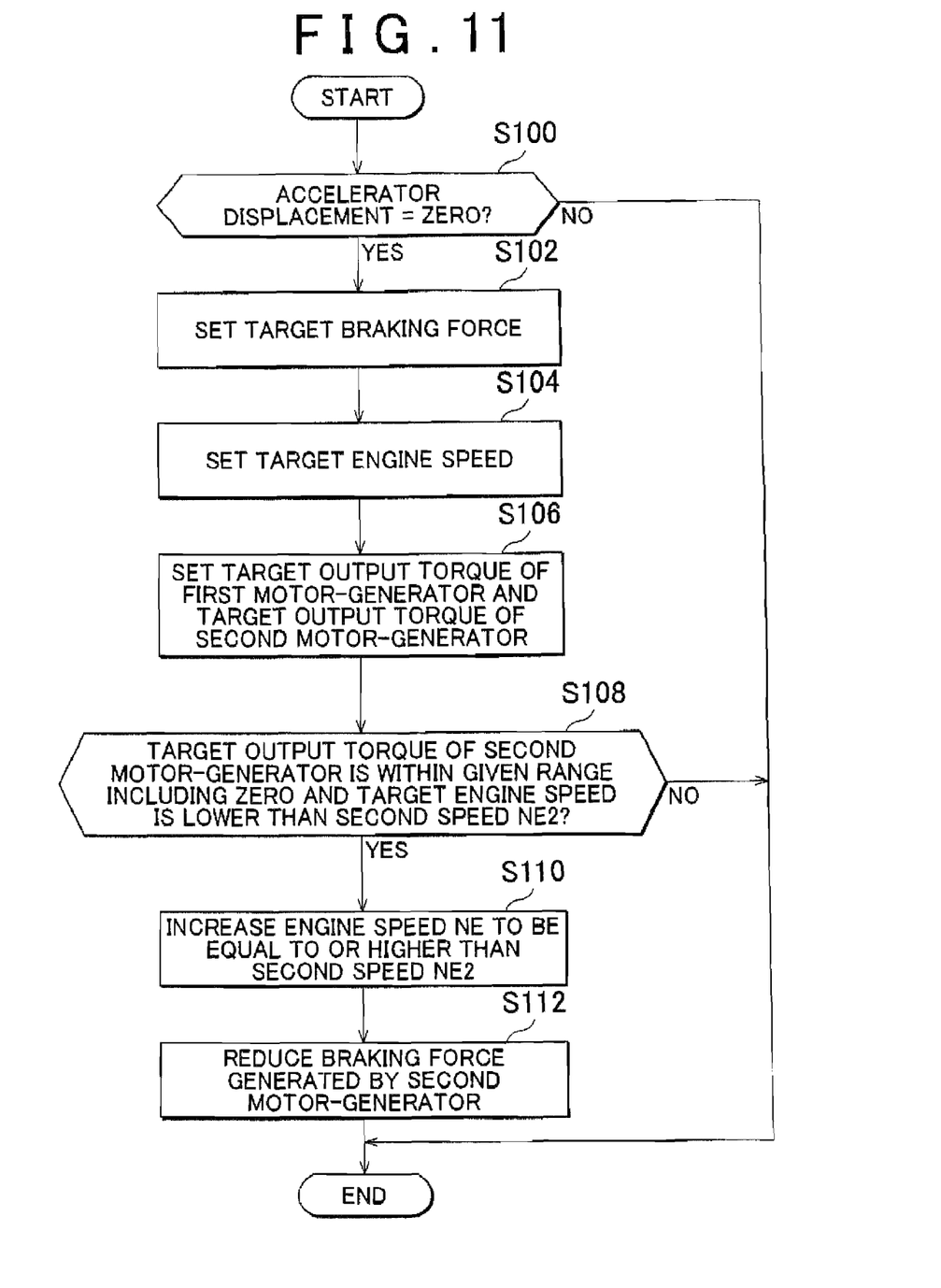
FIG. 11 is a flowchart illustrating a control scheme of processing executed by an electronic control unit (ECU) in a first embodiment of the invention.

Referring to FIG. 11, processing executed by the ECU 170 in this embodiment will be described. The following processing may be implemented by software, or may be implemented by hardware, or may be implemented through cooperation of software and hardware.

In step S100, it is determined whether the accelerator depression amount or operating amount is zero. In this embodiment, if the accelerator depression amount is zero, and the brake pedal is not operated, for example, the vehicle is decelerated with braking force obtained by motoring the engine 100 using the first motor-generator 110. Accordingly, if the accelerator depression amount is zero (YES in step S100), a target braking force is set in step S102. A target deceleration may be set instead of the target braking force.

Then, a target engine speed that can realize the target braking force or target deceleration is set. For example, the target engine speed is set according to a map having at least the target braking force or target deceleration as a parameter. The map used for setting the target engine speed is determined in advance by the developer, based on the results of experiments and simulations, for example.

Once the target engine speed is set, a target output torque of the first motor-generator 110 for motoring the engine 100 is determined in step S106. Further, a target output torque of the second motor-generator 120 is determined, so as to make up for the shortage of braking force when the braking force obtained by motoring the engine 100 is insufficient or short of the target braking force. For example, the target output torque is set according to a map having the target engine speed and the target braking force (or target deceleration) as parameters. The map used for setting the target output torque is determined in advance by the developer, based on the results of experiments and simulations, for example.

Once the target engine speed and the target output torque are determined, it is determined in step S108 whether the target output torque of the second motor-generator 120 is within a given range including zero, and the target engine speed is lower than the above-described second speed NE2. If the target output torque of the second motor-generator 120 is within the given range including zero, and the target engine speed is lower than the above-described second speed NE2 (YES in step S108), the engine speed NE is increased to be equal to or higher than the second speed NE2 in step S110. Specifically, if the target output torque of the second motor-generator 120 is within the given range including zero, and the engine speed is lower than the above-described second speed NE2, during deceleration of the vehicle accompanied by motoring of the engine 100, the engine speed NE is increased to be equal to or higher than the second speed NE2.

Figure 12:
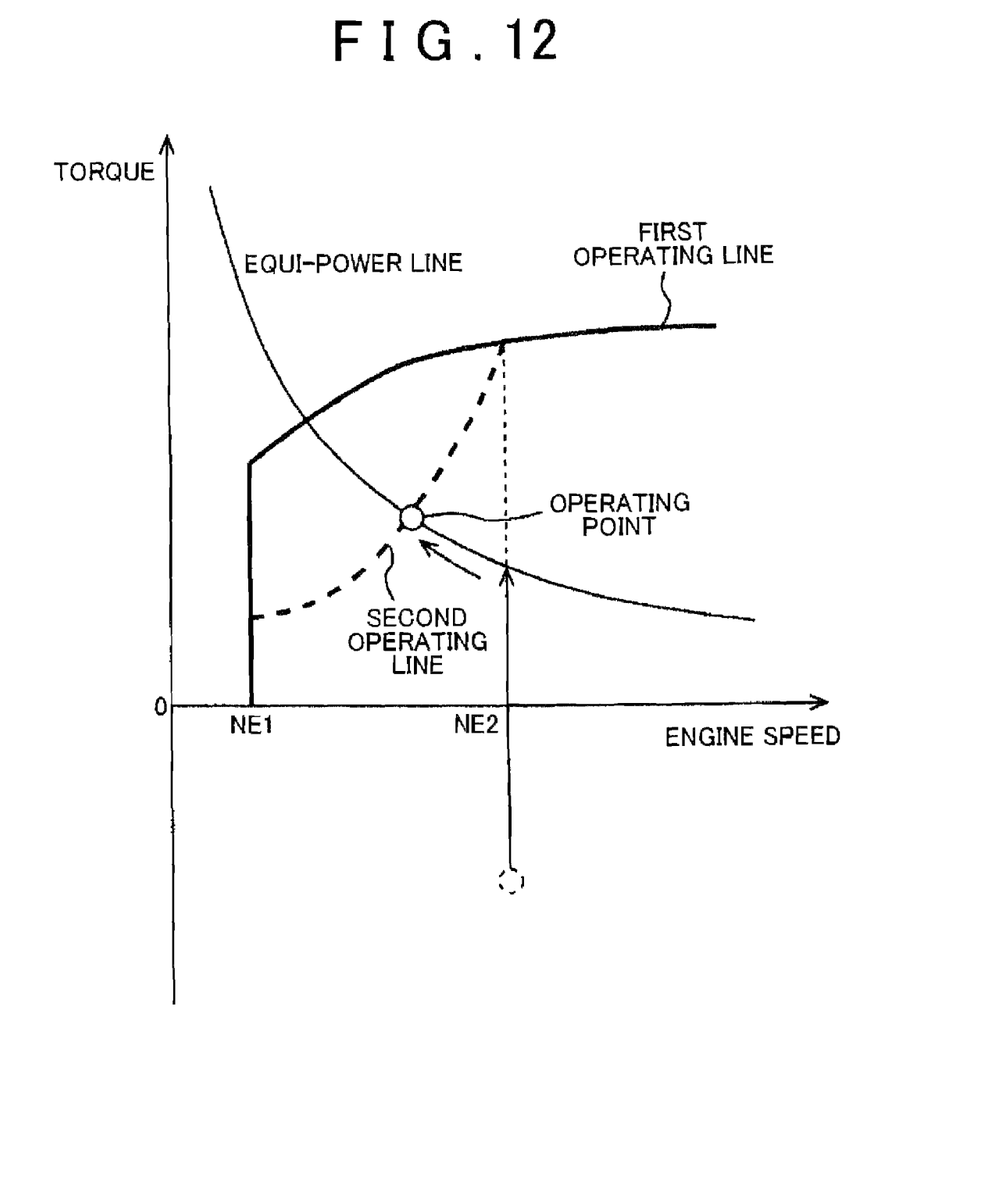
FIG. 12 is a diagram showing a trace of the operating point of the engine.

In this manner, the output torque of the engine 100 can shift from the state in which the engine 100 is motored, to the state in which the engine 100 operates under a load, without passing the second operating line, as shown in FIG. 12. Therefore, sound generated from the power distribution mechanism 130 can be reduced.

Referring back to FIG. 11, the braking force generated by the second motor-generator 120 is reduced in step S112 as the engine speed NE increases. Specifically, the output torque of the second motor-generator 120 is increased in the positive rotational direction (i.e., in such a direction as to accelerate the vehicle). More specifically, the output torque of the second motor-generator 120 is controlled so that the braking force provided by the engine 100 and the second motor-generator 120 when the engine speed NE is equal to the second speed NE2 becomes equal to the target braking force. In this manner, the amount of increase of the braking force due to the increase of the engine speed NE can be reduced.

If the target output torque of the second motor-generator 120 is within the given range including zero and the target engine speed is lower than the above-described second speed NE2 during idle operation (independent operation) of the engine 100 instead of during deceleration accompanied by motoring of the engine 100, the engine speed NE may be increased to be equal to or higher than the second speed NE2.

(Second Embodiment)

In the following, a second embodiment of the invention will be described. This embodiment is different from the above-described first embodiment in that the absolute value of the output torque of the second motor-generator 120 is increased, instead of increasing the engine speed NE to be equal to or higher than the second speed NE2. Further, when the braking force generated by the second motor-generator 120 is reduced because of a change in the output torque of the second motor-generator 120, the engine speed NE is increased. When the braking force generated by the second motor-generator 120 is increased because of a change in the output torque of the second motor-generator 120, the engine speed NE is reduced. The construction and processing of this embodiment other than these features are similar to those of the above-described first embodiment, and will not be repeatedly described in detail.

Figure 13:
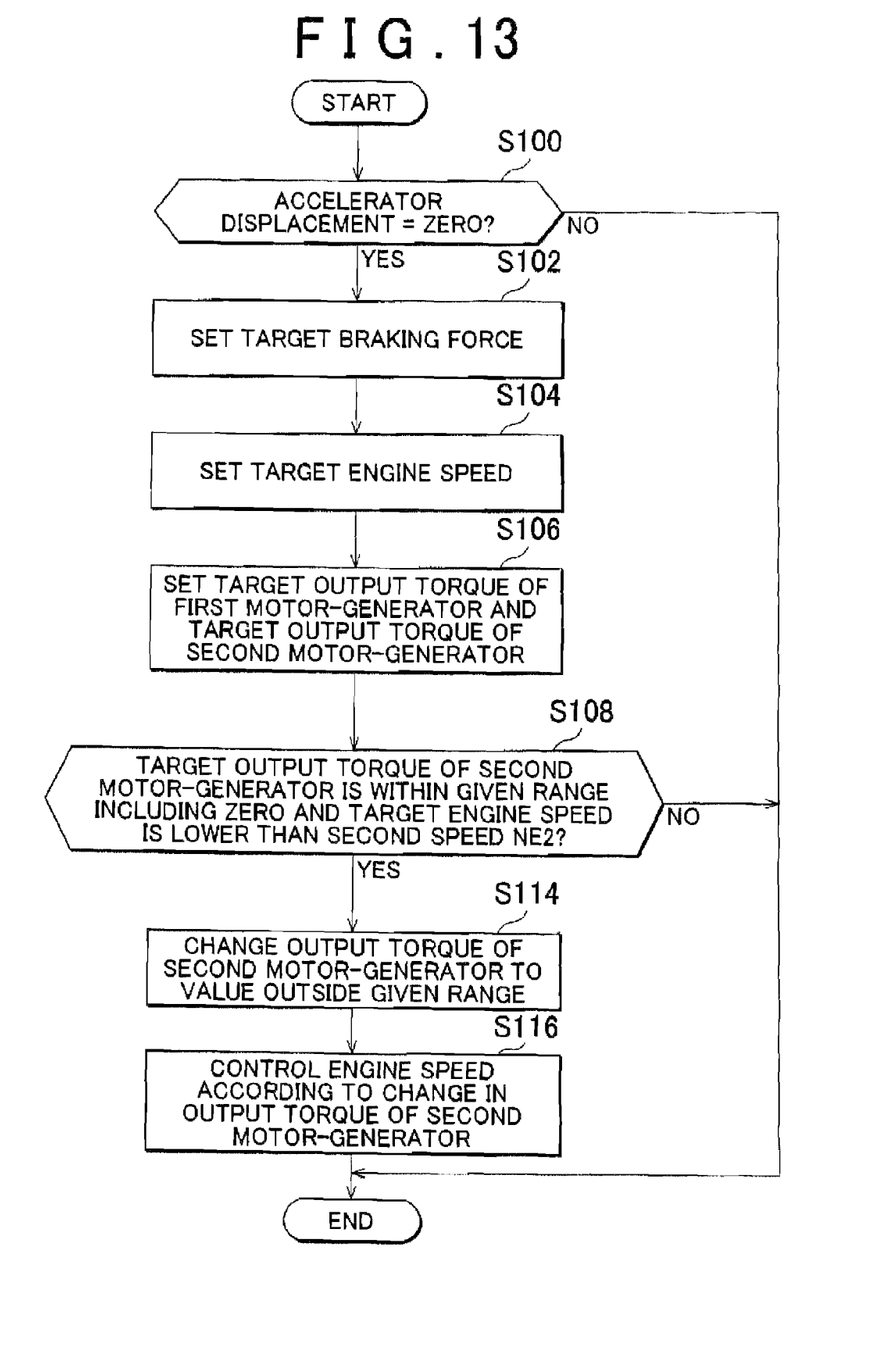
FIG. 13 is a flowchart illustrating a control scheme of processing executed by an ECU in a second embodiment of the invention.

Referring to FIG. 13, processing executed by the ECU 170 in this embodiment will be described. The following processing may be implemented by software, or may be implemented by hardware, or may be implemented through cooperation of software and hardware. The processing from step S100 to step S108 is identical with that of the above-described first embodiment, and thus will not be repeatedly described in detail.

If the target output torque of the second motor-generator 120 is within a given range including zero, and the target engine speed is lower than the above-described second speed NE2 (YES in step S108), the output torque of the second motor-generator 120 is changed to a value outside the given range including zero in step S114. In other words, the absolute value of the output torque of the second motor-generator 120 is made equal to or larger than the absolute value of the upper-limit value TMU shown in FIG. 9 as described above, or equal to or larger than the absolute value of the lower-limit value TML. Specifically, the output torque of the second motor-generator 120 may be made equal to or larger than the upper-limit value TMU or equal to or lower than the lower-limit value TML. A determination as to whether the output torque of the second motor-generator 120 is made equal to or larger than the upper-limit value TMU or made equal to or lower than the lower-limit value TML may be made according to the results of experiments and simulations during development of the vehicle, so that a preferable one is selected.

Further, in step S116, the engine speed NE is controlled in accordance with the change in the output torque of the second motor-generator 120. As one example, when the braking force generated by the second motor-generator 120 is reduced because of the change in the output torque of the second motor-generator 120, the engine speed NE is increased. Specifically, when the output torque of the second motor-generator 120 is made equal to or larger than the upper-limit value TMU, the engine speed NE is increased. Conversely, when the braking force generated by the second motor-generator 120 is increased because of the change in the output torque of the second motor-generator 120, the engine speed NE is reduced. Specifically, when the output torque of the second motor-generator 120 is made equal to or smaller than the lower-limit value TML, the engine speed NE is reduced. In this manner, too, substantially the same effect as that provided in the above-described first embodiment can be obtained.

If the target output torque of the second motor-generator 120 is within the given range including zero and the target engine speed is lower than the above-described second speed NE2 during idle operation (independent operation) of the engine 100 instead of during deceleration accompanied by motoring of the engine 100, the output torque of the second motor-generator 120 may be changed to a value outside the given range including zero.

(Other Embodiments)

While two motor-generators, i.e., the first motor-generator 110 and the second motor-generator 120, are installed on the vehicle in the above-described embodiments, a construction may be employed, in which only the second motor-generator 120 is installed on the vehicle. Specifically, one motor-generator or electric motor serving as a driving power source may be installed on the vehicle.

In this case, the idling speed may be increased or reduced or the engine speed NE may be increased or reduced by changing the gear ratio of the transmission, during deceleration of the vehicle.

In the first embodiment, increasing a rotational speed of the engine 100 (engine) to a value that is equal to or higher than a given value is performed, provided that a target output torque of the second motor-generator 120 (electric motor) is within a given range including zero and a target rotational speed of the engine 100 is lower than the given value, during deceleration accompanied by motoring of the engine 100; in the second embodiment, changing an output torque of the second motor-generator 120 to a value that is out of the given range including zero is performed under the same condition. However, the ECU 170 (controller) may be configured to perform one of or both of the increasing and the changing as appropriate, provided that the target output torque of the second motor-generator 120 is within the given range including zero and the target rotational speed of the engine 100 is lower than the given value, during deceleration accompanied by motoring of the engine 100.

In the above embodiments, the engine 100 functions as an engine in the invention, the second motor-generator 120 functions as an electric motor in the invention, the first motor-generator 110 functions as a second electric motor in the invention, and the ECU 170 functions as a controller in the invention.

The controller may be configured to reduce the braking force generated by the electric motor as the engine speed increases while the control is performed that includes at least one of increasing a rotational speed of the engine to a value that is equal to or higher than a given value and changing an output torque of the electric motor to a value that is out of a given range including zero.

With this arrangement, the braking force achieved by the frictional resistance of the engine and the torque of the electric motor can be kept at a desired value.

The vehicle may further include a second electric motor that is capable of motoring the engine and changing the engine speed.

With this arrangement, the engine speed can be controlled as desired by the second electric motor.

The controller may be configured to increase the engine speed when the braking force generated by the electric motor is reduced because of a change in the output torque of the electric motor while the control is performed.

With this arrangement, the braking force achieved by the frictional resistance of the engine and the torque of the electric motor can be kept at a desired value.

The controller may be configured to reduce the engine speed when the braking force generated by the electric motor is increased because of a change in the output torque of the electric motor while the control is performed.

With this arrangement, the braking force achieved by the frictional resistance of the engine and the torque of the electric motor can be kept at a desired value.

It is to be understood that the embodiments illustrated in this specification are merely exemplary in all points, and the invention is not limited to these embodiments. The scope of the invention is not defined by the above description but defined by the appended claims, and it is intended to include all modifications within the scope of the appended claims and equivalents thereof.

What is claimed is:

1. A hybrid vehicle comprising:
   an engine;
   an electric motor connected to the engine via a gear; and
   a controller configured to perform noise reduction control that includes at least one of increasing a rotational speed of the engine to a value that is equal to or higher than a given value and changing an output torque of the electric motor to a value that is out of a given range including zero, provided that a target output torque of the electric motor is within the given range including zero and a target rotational speed of the engine is lower than the given value, during deceleration accompanied by motoring of the engine in which an output shaft of the engine is rotated using torque from at least one of the electric motor and drive wheels of the vehicle when an ignition of the engine is off.

2. The hybrid vehicle according to claim 1, wherein
   the controller is configured to reduce braking force generated by the electric motor as the rotational speed of the engine increases while the noise reduction control is performed.

3. The hybrid vehicle according to claim 1, further comprising a second electric motor that is capable of motoring the engine and changing the rotational speed of the engine.

4. The hybrid vehicle according to claim 1, wherein
   the controller is configured to increase the rotational speed of the engine when braking force generated by the electric motor is reduced because of a change in the output torque of the electric motor while the noise reduction control is performed.

5. The hybrid vehicle according to claim 1, wherein
   the controller is configured to reduce the rotational speed of the engine when braking force generated by the electric motor is increased because of a change in the output torque of the electric motor while the noise reduction control is performed.

6. A method of controlling a hybrid vehicle including an engine and an electric motor connected to the engine via a gear, the method comprising:
   using an electronic control unit for controlling the engine and the electric motor, and
   performing, by the electronic control unit, noise reduction control that includes at least one of increasing a rotational speed of the engine to a value that is equal to or higher than a given value and changing an output torque of the electric motor to a value that is out of a given range including zero, provided that a target output torque of the electric motor is within the given range including zero and a target rotational speed of the engine is lower than the given value, during deceleration accompanied by motoring of the engine in which an output shaft of the engine is rotated using torque from at least one of the electric motor and drive wheels of the vehicle when an ignition of the engine is off.

7. The method according to claim 6, wherein
   the noise reduction control includes reducing braking force generated by the electric motor as the rotational speed of the engine increases.

8. The method according to claim 6, wherein
the noise reduction control includes increasing the rotational speed of the engine when braking force generated by the electric motor is reduced because of a change in the output torque of the electric motor.

9. The method according to claim 6, wherein
the noise reduction control includes reducing the rotational speed of the engine when braking force generated by the electric motor is increased because of a change in the output torque of the electric motor.

* * * * *